(12) United States Patent
Miklós et al.

(10) Patent No.: US 9,788,294 B2
(45) Date of Patent: Oct. 10, 2017

(54) METHOD, ACCESS CONTROL NODE AND DOMAIN NAME SERVER IN A WIRELESS COMMUNICATION SYSTEM

(75) Inventors: György Miklós, Pilisborosjenő (HU); Johan Rune, Lidingö (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 649 days.

(21) Appl. No.: 13/496,730

(22) PCT Filed: May 20, 2010

(86) PCT No.: PCT/SE2010/050550
§ 371 (c)(1),
(2), (4) Date: Mar. 16, 2012

(87) PCT Pub. No.: WO2011/053216
PCT Pub. Date: May 5, 2011

(65) Prior Publication Data
US 2012/0178416 A1    Jul. 12, 2012

Related U.S. Application Data (60) Provisional application No. 61/256,355, filed on Oct. 30, 2009.

(51) Int. Cl.
*H04W 12/12* (2009.01)
*H04W 60/00* (2009.01)
(Continued)

(52) U.S. Cl.
CPC ....... *H04W 60/00* (2013.01); *H04L 29/12066* (2013.01); *H04L 29/12735* (2013.01);
(Continued)

(58) Field of Classification Search
CPC ....................................................... G06F 15/16
See application file for complete search history.

(56) References Cited

U.S. PATENT DOCUMENTS

2005/0213525 A1*  9/2005  Grayson ............... H04W 4/06
                                                    370/312
2009/0043902 A1*  2/2009  Faccin ................. H04W 76/02
                                                    709/229
(Continued)

FOREIGN PATENT DOCUMENTS

WO   WO 2009065335 A1 *  5/2009
WO   WO 2010/057595 A1   5/2010
WO   WO 2010/083939 A1   7/2010

OTHER PUBLICATIONS

Written Opinion of the International Searching Authority, PCT Application No. PCT/SE2010/050550, dated Sep. 21, 2010.
(Continued)

*Primary Examiner* — Daniel Lai
*Assistant Examiner* — Frank Donado
(74) *Attorney, Agent, or Firm* — Sage Patent Group (57) ABSTRACT

A method in a access control node for selecting of a local gateway co-located with or near a home node is provided. The access control node receives (201) a connectivity request from a user equipment. The user equipment requests a local or remote connection to the home node. The access control node obtains (202) an access point name of the home node. The access control node selects the local gateway co-located with or near the home node by the action of sending (203) a domain name system query to a home node gateway associated with the home node, by addressing a domain name system server. The query comprises a request for an IP address of the local gateway that is associated with the obtained access point name. The access control node selects the local gateway co-located with or near the home node by the further action of receiving (204) a response from the domain name system server. The response comprising the requested IP address of the local gateway.

20 Claims, 5 Drawing Sheets

(51) Int. Cl.
*H04L 29/12* (2006.01)
*H04W 84/04* (2009.01)

(52) U.S. Cl.
CPC ...... *H04L 61/1511* (2013.01); *H04L 61/3075* (2013.01); *H04W 84/045* (2013.01)

(56) References Cited

U.S. PATENT DOCUMENTS

| | | | | |
|---|---|---|---|---|
| 2009/0094680 A1* | 4/2009 | Gupta | ................ | H04L 63/104 726/3 |
| 2009/0270099 A1* | 10/2009 | Gallagher | ............... | H04W 8/08 455/435.1 |
| 2010/0211628 A1* | 8/2010 | Shah | ..................... | H04W 48/17 709/203 |
| 2010/0303009 A1* | 12/2010 | Liu | ....................... | H04W 48/17 370/328 |
| 2011/0096750 A1* | 4/2011 | Velandy | ............... | H04W 48/17 370/331 |
| 2011/0171953 A1* | 7/2011 | Faccin et al. | ............. | 455/426.1 |
| 2011/0261787 A1* | 10/2011 | Bachmann et al. | .......... | 370/331 |
| 2011/0305202 A1* | 12/2011 | Wang | .................... | H04L 41/048 370/328 |
| 2012/0026884 A1* | 2/2012 | Sundell | ................ | H04W 8/065 370/235 |
| 2012/0076047 A1* | 3/2012 | Turanyi | ................ | H04W 76/02 370/254 |

OTHER PUBLICATIONS

International Preliminary Report on Patentability, PCT Application No. PCT/SE2010/050550, dated May 1, 2012.
International Search Report, PCT Application No. PCT/SE2010/050550, dated Sep. 21, 2010.
3GPP Standard, "3$^{rd}$ Generation Partnership Project; Technical Specification Group Core Network and Terminals; Domain Name System Procedures; Stage 3 (Release 8)", No. V8.3.0, Sep. 1, 2009, pp. 1-51 (XP050372833).
3GPP Standard, "3$^{rd}$ Generation Partnership Project; Technical Specification Group Services and System Aspects; Local IP Access and Selected IP Traffic Offload (Release 10)", 238XY-020 LIPA_SIPTO CM, Sep. 1, 2009 (XP050398685).
LG Electronics et al., "Call flows for LIPA Solution 1 Variant 1 with collocated H(e)NB and L-GW", 3GPP Draft; vol. SA WG2, May 14, 2010 (XP050435031).
Motorola et al. "LIPA Solution-1, Stand-alone L-GW with Sxx being both user-lane and control-plane", 3GPP Draft, vol. SA WG2, May 4, 2010 (XP050434593).
Nokia Siemens Network, "HeNB's S1 simplification by means of HaNB GW", 3GPP Draft, vol. RAN WG3; Feb. 5, 2008 (XP050163378).

* cited by examiner

METHOD, ACCESS CONTROL NODE AND DOMAIN NAME SERVER IN A WIRELESS COMMUNICATION SYSTEM

CROSS REFERENCE TO RELATED APPLICATIONS

This application is a 35 U.S.C. §371 national stage application of PCT International Application No. PCT/SE2010/050550, filed on 20 May 2010, which itself claims priority to U.S. provisional Patent Application No. 61/256,355, filed 30 Oct. 2009, the disclosure and content of both of which are incorporated by reference herein in their entirety. The above-referenced PCT International Application was published in the English language as International Publication No. WO 2011/053216 A1 on 5 May 2011.

TECHNICAL FIELD

The present invention relates to an access control node, a method therein, a domain name system server and a method therein. More specifically it relates to selecting of a local gateway co-located with or near a home node, and selection for local IP access and selective IP traffic load.

BACKGROUND

The Universal Mobile Telecommunications System (UMTS) is a third generation mobile communication system (3G), which evolved from the Global System for Mobile Communications (GSM), and is intended to provide improved mobile communication services based on Wideband Code Division Multiple Access (WCDMA) access technology. UMTS Terrestrial Radio Access Network (UTRAN) is essentially a radio access network using wideband code division multiple access for user equipment units (UEs). The Third Generation Partnership Project (3GPP) has undertaken to evolve further the UTRAN and GSM based radio access network technologies. In 3GPP this work regarding the 3G Long Term Evolution (LTE) system is ongoing. Specification is ongoing in 3GPP for the Evolved Universal Terrestrial Radio Access Network (E-UTRAN) which is the next generation Radio Access Network (RAN). Another name for E-UTRAN, used in this document, is the Long Term Evolution (LTE) RAN. The core network which E-UTRAN is connected to is called Evolved Packet Core (EPC), a.k.a. System Architecture Evolution (SAE) network. Both the E-UTRAN and the EPC comprise together the Evolved Packet System (EPS) that is also known as the SAE/LTE network. A base station in this concept is called E-UTRAN NodeB, eNodeB or eNB. The ongoing specification also includes the possibility to have an E-UTRAN base station to provide home or small area coverage for a limited number of users. This base station is, in 3GPP, called Home E-UTRAN NodeB (HeNB), (H(e)NB) and in 3G it is called HNB. This kind of home base stations may in general terms be referred to as a "home Node B" or a "home node" and are in this document further on referred to as a "home node" when described in general terms. Other names used for this type of base station are LTE Home Access Point (LTE HAP) and LTE Femto Access Point (LTE FAP).

In 3G, a HNB Gateway is installed at the mobile core network, providing security, aggregation and core network interfaces for HNBs deployed over the IP access network.

In LTE RAN architecture eNBs serve macrocells and HeNBs serve femtocells. The eNBs and the HeNBs have LTE RAN interfaces S1 to the CN, and LTE RAN architecture comprises X2 interfaces, between eNBs. A HeNB Concentrator Node, which can also be referred to as the HeNB Gateway (HeNB GW), can also be comprised between the HeNB and the CN. In at least some configurations a Security Gateway (SEGW) can be logically placed between the HeNB and the HeNB GW and can serve for terminating IPsec tunnels from the HeNB. The main reasons for having a HeNB GW between the HeNBs and the CN are the following:

1. The assumed number of HeNBs in a network is very high, millions of HeNBs is one estimate.
2. End users can switch on and off the HeNB frequently, causing increased signalling load.
3. HeNBs can be tampered with, e.g. malicious or modified software.

The first issue creates a possible scaling problem in the CN side as each HeNB will have its own S1 interface and it is assumed that Mobility Management Entities (MMEs) are not capable of handling millions of S1 interfaces. Therefore, one purpose of the HeNB GW is to conceal the large number of HeNBs from the CN.

The second issue creates a possible signalling load problem in the CN side and this mostly in the MME due to HeNB S1 interfaces being frequently disconnected and reconnected.

The third issue creates a possible security problem in both the MME and Serving GW as any HeNB that is able to establish an IPsec tunnel to a security gateway of the operator's network can attack these nodes.

The HeNB GW is needed to solve these scaling, signalling load and security issues towards the CN. The HeNB GW will act as an eNB proxy for all the HeNBs that are connected to the HeNB GW. The HeNB GW will, from the CN over the S1 interface, look like one eNB with many cells. From the point of view of an HeNB, the HeNB GW will look like the CN, also S1 interface possibly with some additions or modifications.

The number of HeNBs connected to a HeNB GW is likely to be up to several tens of thousands, ~100 000, as the number of HeNB GWs in a full network, ~1 million HeNBs, should not exceed a few tens, ~10. Thus the number of femtocells "served" by an HeNB GW, an eNB proxy, can be up to a few hundreds of thousands, ~200 000, assuming a HeNB on average serves a few, ~2, femtocells.

Some definitions:

Local IP Access (LIPA): Allows an IP-capable user equipment connected via a home node direct access to other IP-capable devices in the local residential/corporate IP network. A IP-capable devices is a device capable of sending and receiving IP packets.

Selected IP Traffic Offload (SIPTO): Offload of selected types of IP traffic (e.g. internet traffic) towards a defined IP network close to the user equipment's point of attachment to the access network. SIPTO is applicable to traffic offload for the macro-cellular access network and for the home node subsystem.

Local Internet Protocol (IP) access and Selective IP Traffic Offload are being standardized for LTE and 3G accesses, allowing the user to get an IP point of presence either at its current base station or at a nearby location. Several solution approaches are currently being discussed. One possible and likely solution approach especially suited for a regular (macro) base station comprises allocating a geographically close GateWay (GW) which corresponds to the Packet Data Network (PDN) GW or Gateway GPRS Support Node (GGSN) in the 3GPP architecture, i.e. the PDN GW or GGSN is local, but for this purpose this local GW may have a reduced feature set, i.e. some more complex function of the PDN GW or GGSN may be omitted such as e.g. on-line charging or Quality of Sevice (QoS) support. E.g. in the case of a home node, a likely solution is to allocate a PDN GW or GGSN, with limited functionality in the home node.

For this to work, functionality is required to enable the selection of that local GW. The GW selection is performed by Serving GPRS Support Node (SGSN) for 3G, and by Mobility Management Entity (MME) for LTE. Even though the current GW selection scheme to a large extent can be re-used, the following issues need to be addressed.

For the case when a UE accesses to internet via 3G access and a close GW, when EPC is not deployed, it is required to be able to select a geographically, i.e., network topology-wise, close GW. The problem is that currently for non-EPC networks there is no way to take location of the UE into account when performing GW selection, other than making the selection SGSN dependant.

When there is a home node GW between the SGSN/MME and the home node, the SGSN/MME needs to be made aware of the IP address of the home node since the SGSN/MME requires to set up a PDP context/PDN connection to the home node and for that procedure the IP address of the home node is needed so that the SGSN/MME knows where to send the setup message to. Otherwise the SGSN/MME has no way to know that address, as it is only aware of the home node GW's address. The MME is the key control-node for the LTE access-network and the SGSN is the key control-node for 3G access network. The MME and SGSN will from now on be referred to in a common term as the "access control node".

The home node may often be switched on/off and it can get a new IP address each time it is switched on again. The IP address of the home node may also change while in operation, depending on the internet service provider's policies.

According to one solution, the RAN node (HNB or RNC) suggests an IP address to the GGSN in a new parameter in Iu when a new PDP context is set up. The Iu interface is the interface which links the RNC with either a 3G Mobile Switching Centre (3G MSC) or a 3G SGSN. Regarding this solution to send the GW address during connection establishment to the SGSN (or MME for LTE), the following disadvantages are seen:

A future feature of home nodes is "remote access", which means that a UE is able to access a local network connected to a home node, which the UE is allowed to access via the 3GPP operator's network. This solution cannot easily be extended for the remote access use case, as it relies on a RAN node sending an address which can only be a local address not a remote address.

In the case of LTE, the IP address of the home node would need to be attached a Non Access Stratum (NAS) message. A NAS message is the control messages that are exchanged between the UE and the core network which are not radio-related messages. However, the NAS messages are encrypted and hence there is no way for the RAN node (eNodeB) to know which NAS message is being sent. This has the consequence that the IP address of the home node GW would be sent for all NAS messages, which means that the address would be sent unnecessarily in a lot of cases. This consumes unnecessary bandwidth and processing.

This approach deviates from the current GW selection procedure which relies on DNS. Hence, this introduces additional implementation burden into the MME/SGSN. The solution requires the RAN node to be configured with the home node GW's address. In some cases, such as a GGSN located near the RNC site, this would pose additional configuration burden on the RNC. This would also mean that a legacy RNC node would not be able to support this feature.

SUMMARY

It is therefore an object of the invention to provide a dynamic way of selecting a local gateway co-located with or near a home node.

According to a first aspect of the invention, the object is achieved by a method in a access control node for selecting of a local gateway co-located with or near a home node.

The access control node receives a connectivity request from a user equipment. The user equipment requests a local or remote connection to the home node. The access control node obtains an access point name of the home node. The access control node selects the local gateway co-located with or near the home node by the action of sending a domain name system query to a home node gateway associated with the home node, by addressing a domain name system server. The query comprises a request for an IP address of the local gateway that is associated with the obtained access point name. The access control node selects the local gateway co-located with or near the home node by the further action of receiving a response from the domain name system server. The response comprising the requested IP address of the local gateway.

According to a second aspect of the invention, the object is achieved by a method in a domain name system server for enabling selection of a local gateway for a user equipment. The local gateway is co-located with or near a home node serving the user equipment. The domain name system server receives from an access control node, a domain name system query to a home node gateway associated with the home node. The domain name system query comprises a request for a local gateway IP address that is associated with an access point name associated with the home node. The access point name is comprised in the received domain name system query. The domain name system server obtains from the home node gateway, the IP address of the local gateway that is associated with the access point name. The domain name system server then sends a response to the access control node. The response comprises the requested IP address of the local gateway, which IP address of the local gateway enables the access control node to select the local gateway.

According to a third aspect of the invention, the object is achieved by an access control node for selecting of a local gateway co-located with or near a home node. The access control node comprises a receiver configured to receive a connectivity request from a user equipment. The user equipment requests a local or remote connection to the home node. The access control node further comprises an obtaining unit configured to obtain an access point name of the home node. The access control node further comprises a sending unit configured to send a domain name system query to a home node gateway associated with the home node, by addressing a domain name system server. The query comprises a request for an IP address of the local gateway that is associated with the obtained access point name. The receiver is further configured to receive a response from the domain name system server, the response comprising the requested IP address of the local gateway.

According to a forth aspect of the invention, the object is achieved by a domain name system server for enabling selection of a local gateway for a user equipment. The local gateway is co-located with or near a home node serving the user equipment. The domain name system server comprises a receiver configured to receive from an access control node, a domain name system query to a home node gateway associated with the home node. The domain name system query comprises a request for a local gateway IP address that is associated with an access point name associated with the home node. The access point name is comprised in the received domain name system query. The domain name system server further comprises an obtaining unit configured to obtain from the home node gateway, the IP address of the local gateway that is associated with the access point name. The domain name system server further comprises a sending unit configured to send a response to the access control node. The response comprises the requested IP address of the local gateway. The IP address of the local gateway enables the access control node to select the local gateway.

Advantages with the present solution are that gateway selection is dynamic, which is a solution that works even when such addresses may dynamically change each time the home node 110 acquires a new address. The present solution allows the local gateway 130 to be selected when it is co-located with the home node 110, and even if the home node gateway 150 is in between the home node 110 and the access control node 140.

DETAILED DESCRIPTION

Figure 1:
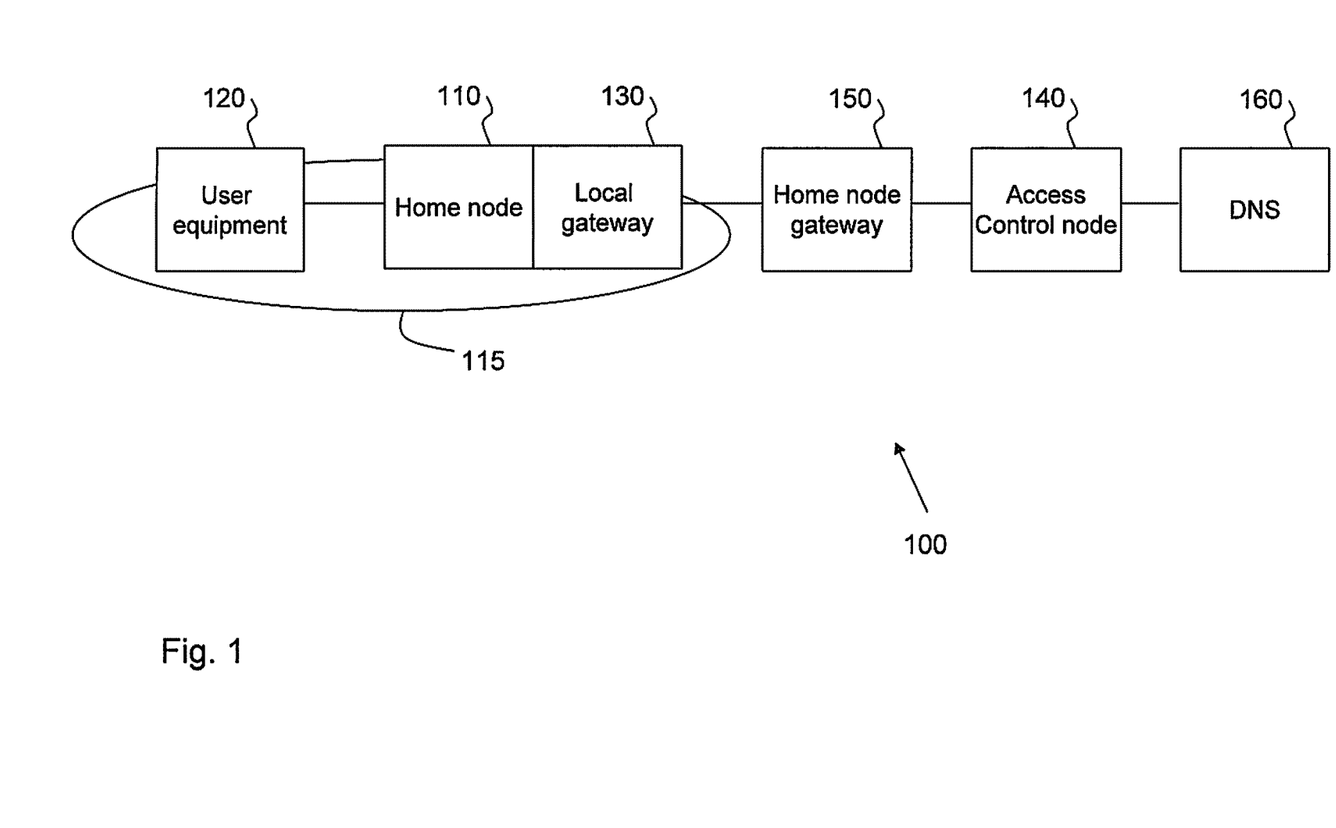
FIG. 1 is a block diagram illustrating wireless communication system according to some embodiments.

FIG. 1 depicts a wireless communications system 100 in which the present solution may be implemented. The wireless communications system 100 may e.g. be an UMTS communications system or a LTE communications system.

The wireless communications system 100 comprises a home node 110 serving a cell 115, which cell 115 covers a home or small area for a limited number of users. This home node 110 may also be referred to as a home base station, a home Node B or a home node and is, in 3GPP, called Home E-UTRAN NodeB (HeNB) or (H(e)NB), and in 3G it is called HNB. Other names used for this type of base station are LTE HAP and LTE FAP. The home node 110 is capable of communicate with user equipments being present in the cell 115 over a radio carrier.

A user equipment 120 being present within the cell 115, is served by the home node 110, and is therefore capable of communicating with the home node 110 over an air interface. The user equipment 120 may be a terminal, e.g. a mobile terminal or a wireless terminal, a mobile phone, a computer such as e.g. a laptop, Personal Digital Assistants (PDA), or any other radio network units capable to communicate with a home node over an air interface.

The home node 110 is co-located with a local gateway 130. The local gateway may be a PDN GW or GGSN, with limited functionality in the home node 110. It is this local gateway 130 that shall be selected according to the present solution.

The wireless communications system 100 further comprises an access control node 140. The access control node 140 may be a MME node or a SGSN node, and is the key control-node for access to the wireless communications network 100.

The wireless communications system 100 further comprises a home node gateway 150. This means that there are two different types of gateways. One is the local gateway 130 mentioned above, that is co-located with the home node 110 for which in the text below, an IP address shall be requested. But there is another entity called home node gateway 150 which is comprised in the operator's network and is in some embodiments located in between the home node 110 and the access control node 140.

The wireless communications system 100 further comprises a Domain Name System server (DNS) 160 which will be used in the method described below. The DNS server 160 is operated by the same 3GPP operator which runs the access control node 140. A DNS is a hierarchical naming system for computers, services, or any resource connected to the Internet or a private network. It associates various information with domain names assigned to each of the participants. E.g. it allocates IP addresses to computers and nodes.

It is desired to select a GW "below" the SGSN to select a GW close to the user, so a more fine-grained location info than just SGSN granularity is required. For this, it may be necessary to make the GW selection dependent on the current Routing Area Identifier (RAI) of the user. When EPC is deployed, this is already solved by the EPC GW selection mechanisms using Domain Name System (DNS).

The basic concept of the present solution provides that the gateway selection of a local gateway is based on a query performed by the access control node 140, which may typically be a DNS query in line with current gateway selection mechanisms. Both gateway selection according to prior art and the gateway selection according to the present solution are based on DNS query. The difference is that the gateway selection according to prior art is static, meaning that IP addresses are pre-configured in the DNS system. In the present solution scheme, the IP address of the local gateway 130 being co-located with the home node 110, is dynamic, which is a solution that works even when such addresses may dynamically change each time the home node 110 acquires a new address. The present solution allows the local gateway 130 to be selected when it is co-located with the home node 110, and even if the home node gateway 150 is in between the home node 110 and the access control node 140. The solution allows the selection of a gateway co-located or near the user equipment 120's current home node 110, or alternatively to connect to a specific home node 110 remotely. E.g. the user may have a femto base station with a built-in gateway at home, and he/she may want to connect the user equipment 120 to that specific home node 110 remotely. The gateway may be "near" the user equipment 120 and it might even have an IP address that is different from the home node 110 in case it is not co-located.

The present solution relating to this method in the access control node 140 for selecting the local gateway 130 co-located with or near the home node 110, according to some embodiments will now be described with reference to the flowchart depicted in FIG. 2. The home node gateway 150 has stored the relationship between an identifier identifying the home node 110 such as e.g. the cell identity of the cell 115 of the home node 110, and the IP address of the local gateway. The home node gateway 150 thereby knows the current IP address of the home node 110 that also is the current IP address of the local gateway 130. Typically the local gateway 130 is co-located with the home node 110, it have the same IP address as the home node 110, but in more general case when they are not co-located and have a different IP address. This may e.g. be since when the home node 110 is switched on or gets a new IP address it registers its address, i.e. the home node and local gateway 130 IP address, from now on denoted the local gateway 130 IP address, implicitly or explicitly at the home node gateway 150. Then, when a new connection between the user equipment 120 and the core network is to be established, the present solution comprises the following steps, here referred to as actions in order for the access control node 140 to find the IP address of the local gateway 130 co-located with the home node 110 so that it can select the local gateway 130. The method is described from perspective of the access control node 140. The actions may be carried out in another suitable order than described below when it is appropriate and will be understood by a person skilled in the art.

Action 201

In order to communicate in the local network, or to get internet access via the local network, the user equipment 120 initiates a local or remote connection to the home node 110 by activating a new PDP context/PDN connection to the access control node 140. In this step, the access control node 140 receives the connectivity request from the user equipment 120. The user equipment 120 requests a local or remote connection to the home node 110, which connection request may comprise a Packet Data Protocol (PDP) context or a Public Data network (PDN) connection activation request.

Action 202

The access control node 140 obtains an Access Point Name (APN). In some embodiments the access point name comprises a cell identifier or a remote-access-ID.

An APN identifies an IP Packet Data Network (PDN), that a mobile data user wants to communicate with.

The APN may be supplied in the connectivity request from the user equipment 120. The sending of the APN from the user equipment 120 is optional. If the user equipment 120 does not send the APN, the access control node 140 may use a default APN.

In some embodiments the APN indicates whether this is a local or remote connection to the home node 110.

The access point name may e.g. be obtained from the received connectivity request or by bringing a default access point name. The access point name when obtained from the connectivity request may indicates that Local IP Access or Selective IP Traffic Offload shall be used for the connection.

In some embodiments the access point name comprises a cell identifier, a home node identifier or remote-access-ID.

The cell identifier may be a service area identity, an Universal Terrestrial Radio Access Network cell identity, or an extended radio network controller identity.

The cell identifier may be used to identify the home node 110. The cell identifier may comprise a home node identifier or the identifier of a closed subscriber group.

The cell identifier may be obtained by using information available in an S1/Iu message carrying a non access stratum command to setup the new Local IP Access or Selective IP Traffic Offload connection.

The access control node 140 selects the local gateway 130 co-located with or near the home node 110 by performing the actions 203 and 204.

Action 203

To be able to select the local gateway 130, the access control node 140 requires to find the IP address of the local gateway 130. Therefore the access control node 140 sends a DNS query to the home node gateway 150 associated with the home node 110, by addressing the DNS server 160. The DNS query comprises a request for an IP address of local gateway 130 that is associated with the obtained APN.

In some embodiments the access point name comprises a cell identifier or a remote-access-ID. In these embodiments the request comprises a request for an IP address of local gateway 130 that is associated with the cell identifier or the a remote-access-ID comprised in the obtained access point name.

In some embodiments, the access control node 140 adds user or location information to the APN to supply information for the particular home node 110 at the user equipment's 120 current location. E.g. a cell identifier.

This action may be performed by the access control node 140 performing a DNS query based on the APN possibly with any added user equipment or location information. The home node 110 is identified by the APN which possibly comprises other information such as an identity of the home node. The DNS query may comprise a text string which is mapped by the DNS system to an IP address (or multiple addresses). The step will be further explained together with different embodiments below.

The DNS system may forward the query to the appropriate home node gateway 150 corresponding to the user equipment 120 that can authoritatively answer the query, or alternatively the DNS system may answer the query based on a priori information received e.g., by Dynamic DNS from the home node gateway 150.

In some embodiments, an identifier of the home node gateway 150 is comprised in the connectivity request. This identifier of the home node gateway 150 may be added to the domain name system query.

In some embodiments, the domain name system query may comprise a request for an IP address of the home node 110 that is associated with the cell identifier, the home node identifier or the remote-access-ID comprised in the obtained access point name.

The user or location information may be added to the access point name.

Action 204

The access control node 140 receives the response from the DNS, which response comprises the requested IP address of local gateway 130.

The access control node 140 then proceeds with the connection establishment based on the requested IP address of local gateway 130. The access control node 140 contacts the local gateway 130 co-located with the home node 110, using the received IP address of the local gateway 130 for establishing a session between the local gateway 130 and the access control node 140.

In some embodiments Local IP Access or Selective IP Traffic Offload is to be applied. In these embodiments an evolved universal terrestrial radio access network cell global identity or a home node 110 identifier, and an identifier of the home node gateway 150 may be added to the domain name system query, or is sent as parameters to the domain name system server 160.

In some embodiments remote access may be applied. Then the access point name may comprise a closed subscriber group identifier, which closed subscriber group identifier may be added to the domain name system query.

The present solution relating to a method in the domain name system server 160 for enabling selection of a local gateway for the user equipment 120, according to some embodiments will now be described with reference to the flowchart depicted in FIG. 3. As mentioned above the local gateway 130 is co-located with or near the home node 110 serving the user equipment 120. The method comprises the following actions, which actions may as well be carried out in another suitable order than described below.

Action 301

The domain name system server 160 receives from the access control node 140, a domain name system query to a home node gateway 150 associated with the home node 110. The domain name system query comprises a request for the local gateway 130 IP address that is associated with an access point name associated with the home node 110. The access point name is comprised in the received domain name system query.

The access point name may comprises a cell identifier, a home node identifier or remote-access-ID. In these embodiments, the domain name system query may comprise a request for an IP address of the home node 110 that is associated with the cell identifier, the home node identifier or the remote-access-ID comprised in the obtained access point name.

In some embodiments Local IP Access or Selective IP Traffic Offload is to be applied In these embodiments, an evolved universal terrestrial radio access network cell global identity or a home node 110 identifier, and an identifier of the home node gateway 150 may be comprised in the domain name system query, or may be received as parameters from the access control node 140.

Action 302

This is an optional step. In some embodiments the domain name system server 160 forwards the received domain name system query to the home node gateway 150 corresponding to the user equipment 120.

In some embodiments, an identifier of the home node gateway 150 is comprised in the domain name system query received from the access control node 140. The identifier of the home node gateway 150 may be used to identify the home node gateway 150 for forwarding the domain name system query to it.

Action 303

The domain name system server 160 obtains from the home node gateway 150, the IP address of the local gateway 110 that is associated with the access point name.

In the embodiments wherein the domain name system query that were forwarded to the home node gateway 150 in Action 302, the IP address of the local gateway 110 being associated with the access point name is obtained from the home node gateway 150, answering the query.

This action of obtaining 303 the IP address of the local gateway 130 may be performed by receiving it from the home node gateway 150 a priori of the action of receiving 601 the a domain name system query.

Action 304

The domain name system server 160 sends a response to the access control node 140. The response comprises the requested IP address of the local gateway 130. The IP address of the local gateway 130 enables the access control node 140 to select the local gateway 130.

Different embodiments will now be described more in detail in relation to the method actions above. According to the present solution, the access control node 140, i.e. the MME/SGSN, selects the local gateway 130 co-located with the home node 110.

A First Embodiment Using Local IP Access and Selective IP Traffic Offload

Here, a first embodiment of the present solution is described referring the actions described above. As pointed out above, the network access control node 140 requires to find out the IP address of the local gateway 130 co-located with the home node 110. The reason why the IP address of the local gateway 130 is not known at the access control node 140 in this embodiment is that the presence of the home node gateway 150 hides the local gateway 130's IP address from the access control node 140.

Obtaining APN represented by a cell id, relating to action 202.

This embodiment is based on the home node gateway 150 storing the relationship between a cell identifier of the home node 110 and the local gateway 130's IP address. The cell identifier is comprised in the APN obtained in action 202. For 3G it may be plain cell id, for LTE it is an evolved cell id (ECG). This information is available when the home node gateway 150 sets up an S1/Iuh relationship with the home node 110 and receives an S1 SETUP REQUEST/HNB REGISTRATION REQUEST message. S1 is the reference point in LTE between a HeNB and the HeNB GW. Iuh is the reference point in 3G between HNB and HNB GW. Note that in this context the cell id is used to identify the home node 110 itself, and for this purpose other identifiers might also be used such as the home node identifier or possibly the identifier of the Closed Subscriber Group (CSG) but with the current specification the cell identifier is the one most readily available for this purpose. The term CSG is used to identify a specific group of user equipments who are permitted access to a home node. Note that the access control node 140 may become aware of, i.e. obtain the cell identifier by using information available in the S1/Iu message carrying a NAS command to setup the new LIPA/SIPTO connection.

Now relating to action 203 wherein the access control node 140 sends a request to the home node gateway 150 associated with the home node 110, by addressing the DNS server 160. The request comprises a request for an IP address of the local gateway 130 that is associated with the obtained APN, i.e. the cell id comprised in the APN. This means that depending on the solution, the cell id may either be part of the APN, or prepended to it. Because the home node gateway 150 knows the relationship between the cell identifier and the IP address of the local gateway 130, it can be relied on the home node gateway 150 to provide the local gateway 130's IP address when required for the access control node 140 by using a query-response message pair. The access control node 140 sends to the DNS server 160 a request for the IP address of local gateway 130 that is associated with the cell id enclosed in the request. The DNS query is sent to the operator's DNS server 160, which may be configured in such a way that the appropriate home node gateway 150 is configured as the authoritative DNS server to respond to such a query. Hence the DNS query will be forwarded to the home node gateway 150 itself, which may provide the response based on its stored mapping of the cell-id to the IP address of the local gateway 130. As an optional extension to this solution, a Dynamic DNS mechanism may be deployed between the home node gateway 150 and the DNS server 160, so that the home node gateway 150 can inform the DNS server 160 of the cell-id to the home node 110 address mapping ahead of time. Then the DNS server 160 may immediately answer the DNS query without asking the home node gateway 150, and it is sufficient to provide a dynamic DNS client within the home node gateway 150 rather than a full DNS server.

An advantage with this embodiment is that it results in a simplified operation and management as the DNS server 160 remains the single system for managing local gateway selection information. A further advantage with this embodiment is that the handling of the local gateway selection is similar in the access control node 140 for both LIPA/SIPTO and for regular connections. A further advantage with this embodiment is that there is no impact on S1/Iu/Iuh interfaces. A further advantage with this embodiment is that the DNS based approach is very flexible for future extensions if new requirements emerge.

In this embodiment, the access control node 140 may use some combination of the S11/S5/Gn interface to contact the local gateway 120 in the home node 110 when performing action 207. S11 is the interface between MME and SGW. S5 is the interface between SGW and PGW. Gn is the interface between SGSN and GGSN.

(In the case of LTE, the use of a home node gateway is optional. When a home node gateway is not present, the DNS resolution is unnecessary, as the MME knows the mapping from the evolved cell-id to the home node address on its own.)

The method for selecting of the local gateway 130 co-located with the home node 110, according to an example of the first embodiment will now be described with reference to the combined signalling and flowchart depicted in FIG. 4. In a first variant of the first embodiment the APN comprises a cell identifier of the cell 115. In this example the cell identifier is the E-UTRAN Cell Global Identity (ECGI). Only the some of the actions depicted in the figure is described here.

Figure 4:
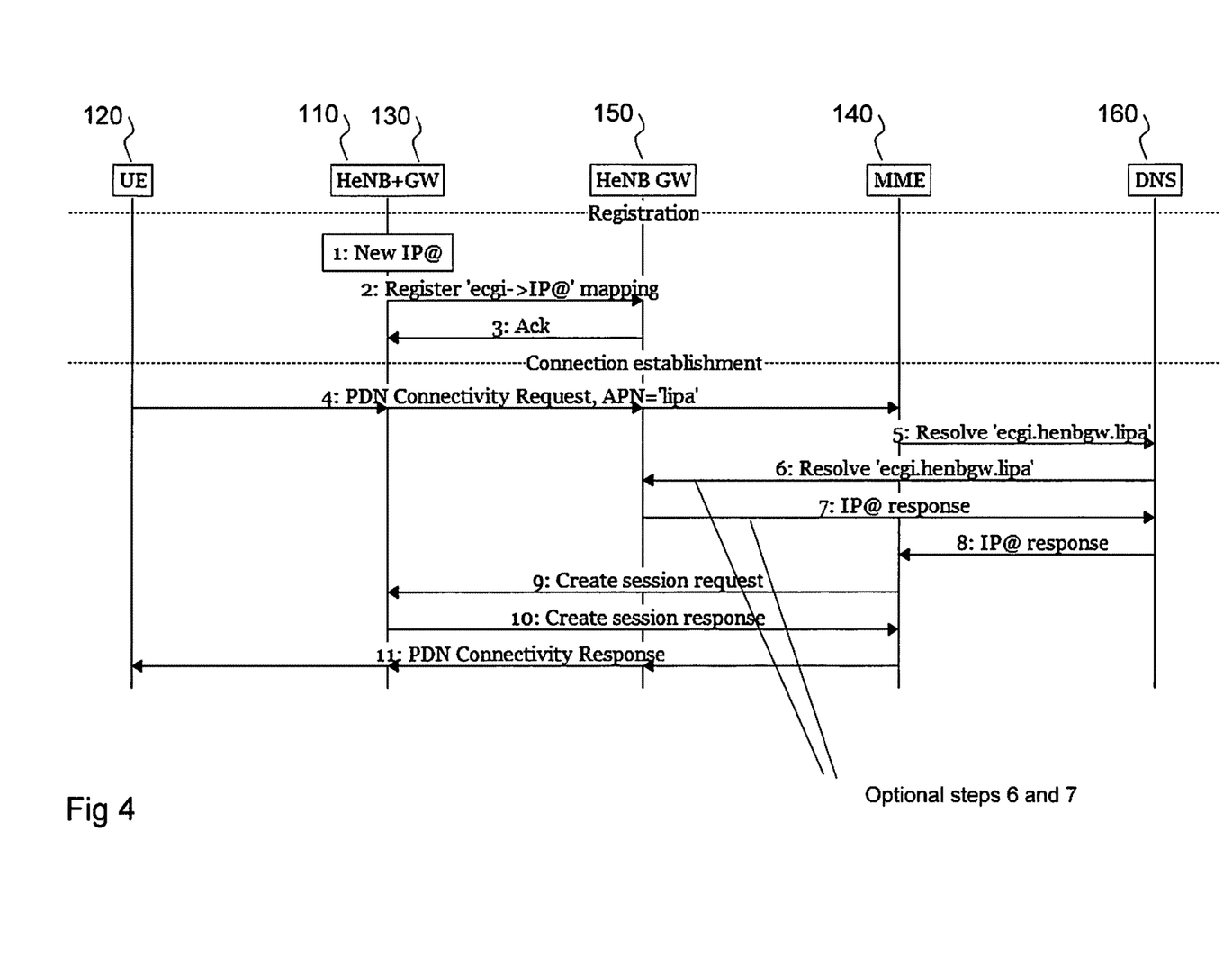
FIG. 4 is a signaling diagram illustrating selection of a local gateway according to some embodiments.

FIG. 4, action 1. The home node 140 co-located with the local gateway 130 acquires a new local gateway 130 IP address.

FIG. 4, action 2. The home node 140 requests the home node gateway 150 to register a mapping of the local gateway 130 IP address with the cell identifier e.g. the ECGI of its cell 115 to the home node gateway 150. In LTE this may e.g. be performed by the home node 110, i.e. HeNB registering its <GW IP address, ECGI> relationship(s) at the home node gateway 150, i.e. HeNB gateway. Correspondingly for 3G the home node 110, i.e. HNB registers its <GW IP address, SAI> relationship(s) at the home node gateway 150, i.e. HNB gateway. The Service Area Identity (SAI) may potentially be replaced by the UTRAN Cell ID or the Extended RNC ID. Here ECGI/SAI refers to all the cells supported by the given home node 110 in combination with the local gateway. Note that this requires a new Information Element (IE) to be added to the S1 SETUP REQUEST message to include also the ECGI as a parameter. Optionally, the local gateway 130 IP address may be added as a parameter for more flexibility, or else the home node 110's IP address may be re-used. I.e., in the typical case the local gateway 130 is co-located with the home node 110 (HeNB or HNB) and use the same IP address. In the case of 3G, the SAI, the UTRAN Cell-ID and the Extended RNC ID may be included in the HNB REGISTER REQUEST message. In the case of LTE, the S1 SETUP REQUEST comprises the Global eNB ID IE, which holds the value of the ECGI. The SAI may be used, if it is guaranteed to be unique per home node. Otherwise it may be more preferable to replace the SAI with the UTRAN Cell ID which may be used, in which case there could be more than one of them listed, or the Extended radio network controller ID, as the identifier registered together with the local gateway 130 IP address.

FIG. 4, action 3. The home node gateway 150 stores the local gateway 130 IP address and the cell identifier ECGI mapping and sends an acknowledgement to the home node 110.

FIG. 4, action 4. The user equipment 120 starts connection establishment by sending an PDN connectivity request to the access control node 150. This step relates to action 201 and 202 above.

During connection establishment in this example, for LTE the access control node 140, i.e. the MME gets the ECGI of the home node 110 as a parameter of a S1AP INITIAL UE MESSAGE or UPLINK NAS TRANSPORT message. Similarly, for 3G the access control node 140, i.e. the SGSN gets the home node 110's, i.e. the HNB's SAI (or UTRAN Cell ID or Extended RNC ID) parameter in a RANAP INITIAL UE MESSAGE or DIRECT TRANSFER message. Some of these parameters are already included in the messages in the current specifications, but in other cases new IEs are needed. For EPS the ECGI is already a mandatory parameter in both the S1AP INITIAL UE MESSAGE and the UPLINK NAS TRANSPORT message. For 3G the SAI is currently mandatory and the Extended RNC ID is optional in the RANAP INITIAL UE MESSAGE, but the UTRAN Cell ID is not included at all. In the RANAP DIRECT TRANSFER message only the SAI is included and as an optional parameter.

The APN sent by the user equipment 120 may e.g. either be a "ECGI.HeNBGW . . . " string itself (assigned to the user equipment 120 by the operator), or it can be something else ("localgw") which the access control node 140 recognizes as LIPA and replaces with "ECGI.HeNBGW . . . ."

Supposedly the APN supplied by the user equipment 120 indicates that LIPA/SIPTO should be used, at least in the case of LIPA in the home node 110, but it is also conceivable that the access control node 140 determines whether LIPA/SIPTO should be applied, e.g. based on policies or subscription data.

FIG. 4, action 5. This action relates to action 203, i.e. the access control node 140 sends a request to the home node gateway 150 associated with the home node 110, by addressing the DNS server 160. The request comprises a request for an IP address of the local gateway 130 that is associated with the obtained APN. The access control node 140 now knows the current ECGI obtained in the connectivity request and performs a DNS query to map ECGI. E.g. a HeNBGW.localgw.plmn.gprs.org to PGW@.

FIG. 4, action 6. This is an optional action to be taken when the DNS is configured such that the DNS query arrives to home node gateway 150 which responds to the query. A home node gateway 150 identifier may be used. The DNS may be configured such that queries including a given home node gateway identifier are forwarded to that node. As an alternative other identifiers which map to a certain home node gateway 150 may be used.

In EPC, if LIPA/SIPTO is to be applied, the access control node 140 may add the ECGI and an identifier of the home node gateway 150 to the DNS query. This may be of the form that ECGI and an identifier of home node gateway 150 are prepended, i.e. prefixed or the APN is decorated by prepending the ECGI and possibly the identifier of the home node gateway 150, and the resulting string is sent as the DNS query. Alternatively these may be put in between existing labels in the APN or in other parts of the DNS query or sent as parameters. The DNS server 160 may be configured such that the DNS query is forwarded to the home node gateway 150 based on its identifier. Note that although the identifier of the home node gateway 150 is a convenient parameter to use for this purpose, the semantics of the parameter has no meaning for the DNS system, when included in a string being represented by a Fully Qualified Domain Name (FQDN). The DNS server 160 may simply be configured with the knowledge that a certain DNS is the authoritative name server for all queries concerning FQDNs with a specific combination of rightmost labels. A logical DNS server within the home node gateway 150 may then authoritatively answer the query by looking up the association between the local gateway 130 IP address and the ECGI, i.e. the <GW IP address, ECGI> association that is already registered. As an alternative the access control node 140 may extract the home node 110 identifier from the ECGI, since the home node 110 identifier in general is a subset of the ECGI bits and in the case of home nodes, according to current specifications, it is equivalent to the ECGI, and prepend the home node 110 identifier instead of the ECGI to the APN. The home node 110 identifier is already included in the S1 SETUP REQUEST, and the home node gateway 150 needs to map the home node 110 identifier into the local gateway 130 IP address. A similar solution is possible for 3G, where the SAI, the UTRAN Cell ID or the Extended RNC ID may be mapped to the home node 110 identifier in the access control node 140. However, in this case the mapping has to be based on a preconfigured database/table, unless the home node 110 identifier may be derived from any of these three identifiers, similar to the case of EPC. Furthermore, if a certain range of the home node identities and ECGIs are allocated to a home node gateway and this range can be identified, e.g., using a binary or hexadecimal or octal or decimal mask on the home node 110 identifier /ECGI, then the digits covered by the mask may be seen as an identifier uniquely identifying the home node gateway 150, which means that no separate home node gateway 150 identifier needs to be added to the APN.

For 3G, a SAI and a home node gateway 150 identifier are added correspondingly to the APN or otherwise and the query is answered by the home node gateway 150.

FIG. 4, action 7. This is an optional action to be performed. In the embodiment where the DNS is configured such that the DNS query arrives at the home node gateway 150. In this step the home node gateway 150 responds to the query, by sending the requested IP address of the local gateway 130 to the DNS server 160.

FIG. 4, action 8. The DNS server 160 forwards the requested IP address of the local gateway 130 to the access control node 140.

Second Variant of the First Embodiment Using HeNB ID/HNB ID.

This is a second variant of the first embodiment relating to the access control node 140 receiving a connectivity request from the user equipment 120 in action 201 and 202 and relating to FIG. 4, action 4. In this second variant the APN comprises the home node 110 identifier. For LTE, the home node 110 identifier is prepended to the APN string, or squeezed in between two labels in the APN, wherein the APN itself is an indication of LIPA/SIPTO, when a new local PDN connection i.e. the connectivity request, is activated. Similarly for 3G, the home node 110 identifier is prepended to the APN by the user equipment 120. The user equipment 120 may become aware of the home node 110 identifier from the system broadcast information or optionally configured manually in the user equipment 120. In any case the user equipment 120 may preferably keep the learned or configured home node identities of home nodes and it is allowed to access in a non-volatile memory. Also, when the home node 110 is switched on or gets a new local gateway IP address, i.e. the local gateway 130 IP address and home node 110 identifier relationship, e.g. <GW IP address, H(e)NB id> relationship is registered within the home node gateway 150, a variant to FIG. 4, action 2. Note that the home node 110 identifier is already included in the current specification of the S1 SETUP REQUEST message. The IP address used to connect to the home node 110 for registering, i.e. for the S1 interface, may be reused as local gateway 130 address, thereby eliminating the need for a new IE for the local gateway 130 address in the S1 SETUP REQUEST message. Similarly for 3G, the home node 110 identifier may be included in the HNB REGISTER REQUEST message and the IP address of the home node 110 used for the Iuh interface may be reused as local gateway 130 IP address.

With this variant, there is no need for the access control node 140 to modify the APN string, i.e. the APN sent by the user equipment 120, it can just use the APN supplied by the user and pass it on to the DNS system. The APN is the string that is normally sent in the DNS query. In some embodiments the APN is decorated by a prefix, and the result is sent in the DNS query. The DNS server 160 may here be configured such that the authoritative DNS server for a given home node 110 resides in its corresponding home node gateway 150. This is made easier if home node 110 identifiers are hierarchically structured, meaning that the home node gateway 150 identifier is contained within the home node identifier. Another simplification from the perspective of the DNS system is that the access control node 140 also in this variant adds a label associated with the home node gateway 150 to the APN, e.g. the home node gateway 150 identifier, preferably to the right of the label representing the home node identifier.

Third Variant of the First Embodiment Using CSG ID

This is a third variant of the first embodiment relating to the access control node 140 receiving a connectivity request from the user equipment 120 in action 201 and 202, and relating to FIG. 4, action 4. This variant uses the Closed Subscriber Group (CSG) IDentity (ID) as the identifier to base the local gateway 130 selection for establishing a LIPA/SIPTO session. This means that in this second variant the APN comprises the CSG ID (not shown). The issue in this case is that a single CSG may be served by multiple home nodes 110 in multiple locations. However, if the deployment guarantees that a given CSG has only one local gateway 130 where LIPA/SIPTO is provided, or, multiple local gateways 130 which all are connected to the same local network, then this approach may be used. If this criterion is not fulfilled, it is possible to define additional CSGs (and CSG IDs) for the LIPA/SIPTO service itself, which may be used for this case. Then a subset of the total CSG identifiers may be set aside for LIPA/SIPTO, and all home nodes 110 which provide LIPA/SIPTO for which the already allocated CSG ID is not sufficient would get an additional CSG ID allocated.

An advantage of this approach is that the CSG ID is already sent from the home node 110 to both the home node gateway 150 during establishment of the S1/Iuh interface when the home node 110 initially connects to the home node gateway 150, and to the access control node 140, during connection establishment, to be kept in the user equipment 120 context in the access control node 140. This means that the access control node 140 has already obtained and is already aware of the CSG ID, and the home node gateway 150 is prepared to map it to a local gateway 130 address. Then, unless the user equipment 120 adds the CSG ID to the APN, the access control node 140 may add the CSG identifier to the DNS query. It is also beneficial if the access control node 140 adds an identifier associated with the home node gateway 150 to the APN, e.g. in the form of a home node gateway 150 identifier in a label to the right of the label representing the CSG ID. This simplifies the configuration of the DNS system.

However, for remote access the user equipment 120 has to supply the concerned CSG ID, since the user equipment 120's current home node 110 cannot provide the CSG ID of a cell belonging to the home node which is the target of the remote access. An advantage of using the CSG ID is then that the CSG ID is already contained in the user equipment 120 in the allowed CSG List, so no additional learning or configuration is needed. Note, however, that in order for the allowed CSG List, or the additional possible CSG list in the user equipment 120, to contain any dedicated LIPA/SIPTO CSG ID as discussed above, care has to be taken that the subscriber associated with the user equipment 120 is administratively included in the CSG(s) corresponding to the concerned LIPA/SIPTO CSG ID(s).

The DNS server 160 may be required to be configured such that the DNS query for a specific CSG ID is forwarded to the home node gateway 150 of the corresponding home node 110.

Operation without Home Node Gateway 150

All variants may be used without a home node gateway 150 if the operator deploys its network without such a home node gateway 150. In that case, the access control node 140 takes the role of the home node gateway 150, and may map the ECGI/SAI/UTRAN Cell ID or the H(e)NB home node ID or the CSG into the local gateway 130 IP address based on the information it has received during the setup of the home node 110. Hence, there is no need for a DNS query in that case.

Additional Deployment Options

The operator has room to customize the solution to its needs by making use of the flexibility in this solution:

It is possible to configure a local gateway IP address that belongs to a standalone gateway rather than the home node 110 itself. For example, to use for a local gateway 130, the gateway at the home node gateway 150, or a local gateway 130 located geographically close to it. This just requires configuration of the DNS server 160 responding to the DNS query.

Instead of using a DNS server within the home node gateway 150, it is possible to have the home node gateway 150 to update the operator's DNS server 160 with the mapping using some form of a dynamic DNS solution. Such solutions are widely available today. This may further simplify the implementation of the home node gateway 150, and can also make the configuration of the DNS server 160 easier since there would not be a need to make sure that the DNS query is routed to the correct home node gateway 150. This may be a preferred solution.

It is possible to have the home node 110 itself to use dynamic DNS to register its local gateway 130 address in the operator's DNS system, rather than have home node gateway 150 to do this. This would simplify the operation, at least for the home node gateway 150. On the other hand, it is not clear if such a dynamic DNS solution is easy to standardize. These solutions are typically very implementation specific, and it may be difficult to force a single specific Dynamic DNS solution to require for all home nodes 110.

Remote Access

In this second embodiment, wherein the user equipment 120 performs a remote access to a home node 110 and the local gateway 130, the local gateway 130 needs to be selected at the user's registered home location, or other location that is the target of the remote access, rather than at its current location.

The method for selecting of the local gateway 130 co-located with or near the home node 110, according to an example of the second embodiment will now be described with reference to the combined signalling and flowchart depicted in FIG. 5. In this embodiment the APN comprises a remote access identifier. Only some of the actions depicted in the figure are described here.

Figure 5:
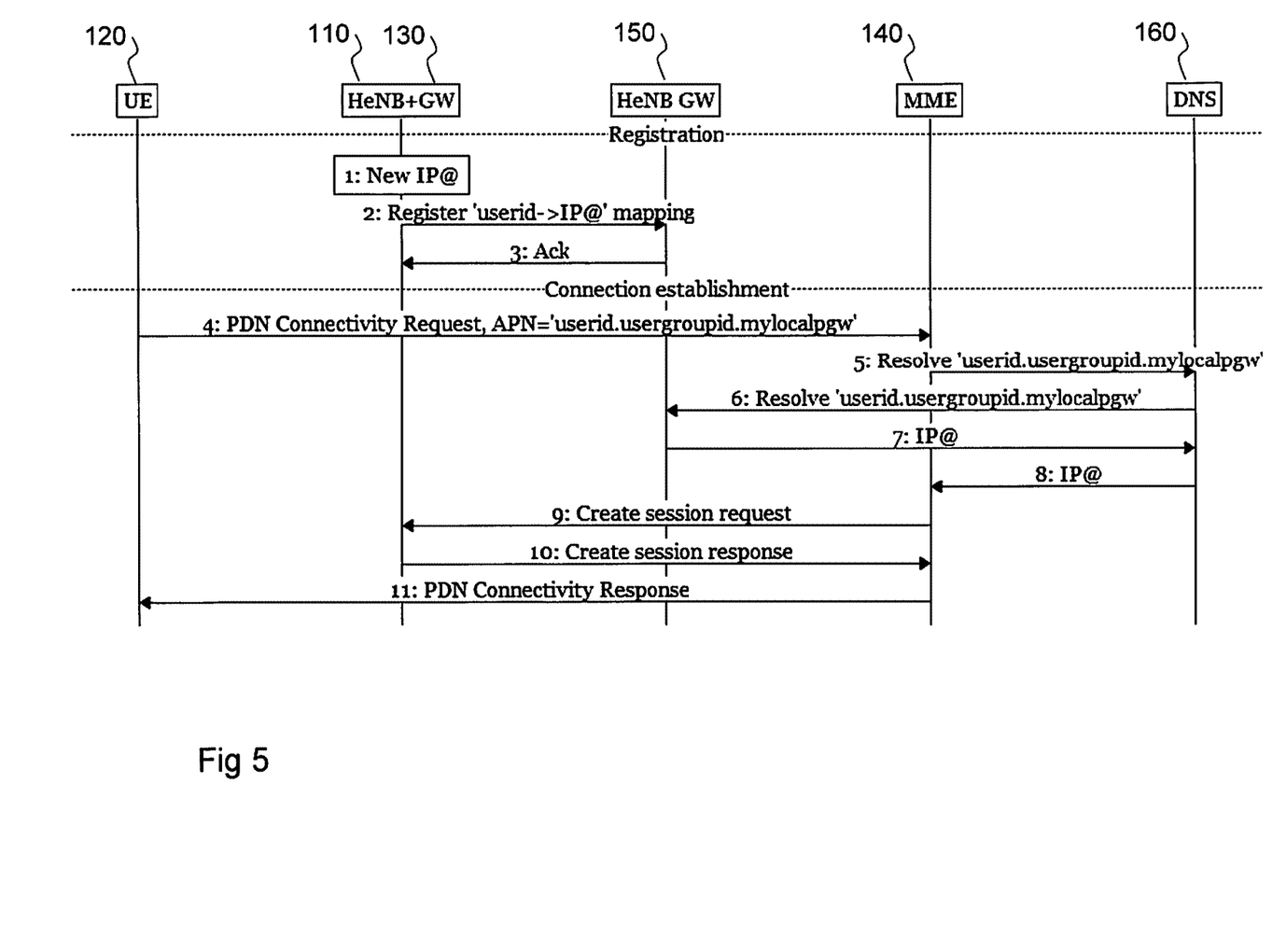
FIG. 5 is a signaling diagram illustrating selection of a local gateway according to some embodiments

FIG. 5, action 1. The home node 140 co-located with the local gateway 130 is switched on or gets a new local gateway 130 IP address.

FIG. 5, action 2. The home node 140 requests the home node gateway 150 to register a mapping of the local gateway 130 IP address with a remote-access-ID.

The following types of remote-access-ID may be used:
ECGI/SAI of the user's home cell (or one of them if there are many)
home node 110 identity of the home node 110 that the user equipment 120 requests remote access to
CSG id of the home cell (if it is not unique to the home node 110, then an additional CSG may be assigned which is unique to the home cell (see section 3.1.1.3))
International Mobile Subscriber Identity (IMSI)
Mobile Station Integrated Services Digital Network (MSISDN)
Any other username or node designation given by the home operator and/or user, provided that it is unique to the user for the purpose of remote access.

In this action the home node 140 associates its local gateway 130 address used for remote access with the remote-access-ID at the home node gateway 150 when the S1 interface is established. If the remote-access-ID is the home node 110 ID this association is particularly simple, since the home node 110 ID is conveyed to the home node gateway 150 (in the S1 SETUP REQUEST/HNB REGISTER REQUEST message) when the home node 110 connects, already in the current specifications, and the IP address that the home node 110 uses when connecting to the home node gateway 150 can be reused as the local gateway 130 IP address.

The remote-access-group-ID is an optional feature that may be used in some deployments. This may be assigned by the operator, such that users with a given remote-access-group-ID map to a certain home node gateway 150. The remote-access-group-ID may be for example an identifier of the home node gateway 150 itself or correspond to the geographic location of the home node gateway 150 according to network topology.

In the depicted example, user identity of the user equipment 120 is used as a remote-access-ID. This registering action may be performed by using the S1 SETUP between the home node 110 and home node gateway 150 to update the home node gateway 150 with the user identity and local gateway 130 IP address, i.e. <userid, IP address> association.

When there is no home node gateway 150, the access control node 140 and its identity may take the role as a home node gateway. Note that this might be a different access control node than the one handling the user equipment 120. Another control node in a pool can serve as backup.

Note that a remote-access-group-ID may also be encoded into the remote-access-ID itself, and in that case there is no need to use a separate remote-access-group-ID.

FIG. 5, action 3. The home node gateway 150 stores the local gateway 130 IP address and remote-access identifier mapping and sends an acknowledgement to the home node 110. E.g. the <userid.usergroupid, IP@> association is stored in the home node gateway 150. The userid and the usergroupid in this context are the same as the remote-access-ID and remote-access-group-ID. The difference is just that the userid and usergroupid are more generic terms, since this concept may be used in other scenarios than remote access. The remote-access identifier may be a user identity and a user group identity. The user identity may e.g. be the IMSI or the ECGI of the user's home cell or the CSG. The user group identity may be based on operator configuration. Note that if there is a home node gateway 150 between the access node 140 and the home node 110, all users having the same user group identity must be using the same home node gateway 150.

FIG. 5, action 4. The user equipment 120 starts the remote connection establishment by sending a connectivity request, such as a new PDP context/PDN connection to the access control node 150 comprising an APN which indicates that this is remote connection. The APN also includes the remote-access-ID and if applicable the remote-access-group-ID, which implicitly or explicitly indicate which home node 110 the remote access should be directed to.

This means that in this case the user equipment 120 supplies an APN string which not only indicates that remote access is requested, but also includes some form of node or user dependent indication, henceforth denoted remote-access-ID, which will be used use to derive which home node 110 the remote access should be directed to. To make it easier to have the DNS system configured such that the query goes to the correct home node gateway 150, also a remote-access-group-ID may be part of the APN string. The remote-access-ID and remote-access-group-ID for remote access may be provided to the user when the subscription for the service is set up, or later on by automatic device configuration of the user equipment 120 or of the home node 110, or by any other automatic or manual configuration method. If the home node 110 is configured with the proper identifier, it may be conveyed to the user equipment 120 either by broadcast information, or by other pairing or configuration methods.

FIG. 5, action 5. In this embodiment, the access control node 140 obtains the APN from the connectivity request received from the user equipment 120.

Note that other alternatives may also exist when the remote-access-ID and remote-access-group-ID are not part of the APN, and instead the access control node 140 adds them. However that approach is less preferred, because it does not allow legacy access control node 140 nodes to support this feature, which would limit the applicability of remote access. In addition it would reduce the flexibility in the remote access choice for the user, since the home node 110 which it would be connected to would have to be unambiguously stipulated by the subscription data. Hence, the preferred alternative is that the access control node 140 does not manipulate the APN string.

This action relates to action 203, i.e. the access control node 140 sends a request to the home node gateway 150 associated with the home node 110, by addressing the DNS server 160. The request comprises a request for an IP address of the local gateway 130 that is associated with the obtained APN. In other words, the access control node 140 performs a DNS query based on the APN.

In the depicted example, the APN comprises a user identity and possibly a user group identity. To establish remote connection, the access control node 140 makes a DNS query based on the APN, e.g. of the form userid.usergroupid.mylocalpgw.plmn.gprs.org. The substring usergroupid.mylocalpgw.plmn.gprs.org maps to the home node gateway 150 handling the user. When the DNS query arrives at the home node gateway 150, it may map the IP address corresponding to the userid.

Dynamic DNS may be used within the network to have the DNS updated with the mapping of the user identity and user group identity to home node gateway 150, i.e. userid.usergroupid→HeNBGW mapping. In this case, it is possible to omit the usergroupid and the DNS system can answer the query without having to contact any home node gateway 150, and thereby skips actions 6-7.

FIG. 5, action 6. In this embodiment, the DNS server 160 forwards the query to the authoritative name server, which is located in the appropriate home node gateway 150 corresponding to the remote-access-ID/remote-access-group-ID, i.e. the home node gateway 150 to which the user's home node 110 is connected, and which can authoritatively answer the query. When applicable, this can be based on the remote-access-group-ID that may be part of the DNS query.

FIG. 5, action 7. The home node gateway 150 to which the user's home node 110 is connected, authoritatively answers the query. I.e. the IP address of the local gateway 130 is sent to the DNS server 160.

FIG. 5, action 8. The response is returned to the access control node 140 which thereby selects the local gateway 130 and proceeds with the connection establishment based on the local gateway 130 IP address.

Advantages with this embodiment is that the DNS lookup is aligned with current mechanism, it also work if the user equipment 120 moves to other non-supporting access control node, dynamic DNS may be used but it is optional and may be vendor-specific, and only requires the home node gateway 150 not the home node 110 to support Dynamic DNS. A further advantage is that it is aligned with other solutions for local access.

The following is a more detailed example of how the APN format may be utilized in the case where the home node 110 ID of the home node which is the target of the remote access connection, is used as the remote-access-ID and no separate remote-access-group-ID is used, although a remote-access-group-ID can be seen as encoded into the remote-access-ID.

In this example the APN used for a remote access connection request comprises a fixed domain name, an incomplete Fully Qualified Domain Name (FQDN), to which the user equipment 120 prepends a home node 110 specific prefix, wherein the fixed domain name indicates "remote access" and the prefix encodes the home node ID of the home node 110 which is the target of the remote access connection.

In this example a convenient binary format is chosen for encoding of the home node ID. The home node ID may coded into the prefix in binary form with one digit in each label in reversed order, i.e. with the most significant bit to the right. When the access control node 140 sends the remote access APN in a DNS query this format gives the DNS server the possibility to defer the query to the home node gateway 150 DNS server which is responsible for the home node ID range which the encoded home node ID belongs to. As previously described the home node gateway 150 is aware of the local gateway IP address of all its connected home nodes, since each home node has registered its local gateway IP address in the home node gateway 150 when the S1/Iuh interface was established, either explicitly, as an IE in the S1 SETUP REQUEST/HNB REGISTER REQUEST message, or implicitly, in the form of the IP address used for the S1/Iuh interface.

Example using a 28-bit H(e)NB ID:
H(e)NB ID:
0001110110000101010101111111
Fixed domain name:
remote-acc.mnc<MNC>.mcc<MCC>.3gppnetwork.org In non-roaming cases any operator-specific fixed domain name could replace mnc<MNC>.mcc<MCC>.3gppnetwork.org part.

Remote access APN (i.e. with the prefix prepended, making it a complete FQDN):
1.1.1.1.1.1.1.0.1.0.1.0.1.0.1.0.0.0.0.1.1.0.1.1.1.0.0.0.
remote-acc. nmc<MNC>.mcc<MCC>.3gppnetwork.org A DNS server for the mnc<MNC>.mcc<MCC>.3gppnetwork.org domain could defer a query for this FQDN (recursively or iteratively) to the DNS server which is the authoritative name server for the 1.1.0.1.1.1.0.0.0.remote-acc.nmc<MNC>.mcc<MCC>.3gppnetwork.org domain. Hence, in this example, the H(e)NB GW hosting the authoritative name server for this domain has been allocated 218-1 H(e)NB IDs (i.e. the range 0001110110000000000-000000000-0001110111111111111111111111).

This requires that each home node gateway 150 is allocated a range of home node IDs, and (E)CGIs to be used by the home nodes, and femtocells, connecting to the home node gateway 150. Note that the home node IDs and (E)CGIs would still be assigned to the home nodes by the Operation and Maintenance system—not by the home node gateway 150.

The same example could be illustrated with a remote-access-ID in the form of an (E)CGI instead of a home node gateway ID. An advantage of using the home node ID is however, that there may be multiple cells served by a single home node, thus making multiple (E)CGI based remote access APNs map to the same home node, whereas the home node ID uniquely identifies a specific home node.

Other prefix, i.e. home node ID, encoding formats than binary may also be used, e.g. decimal, octal or hexadecimal (still with one digit in each label in reversed order). However, binary, octal and hexadecimal formats are more likely to match the actual H(e)NB range allocations than the decimal format and the binary format provide greater granularity in the range allocation than do the octal and hexadecimal formats.

Figure 2:
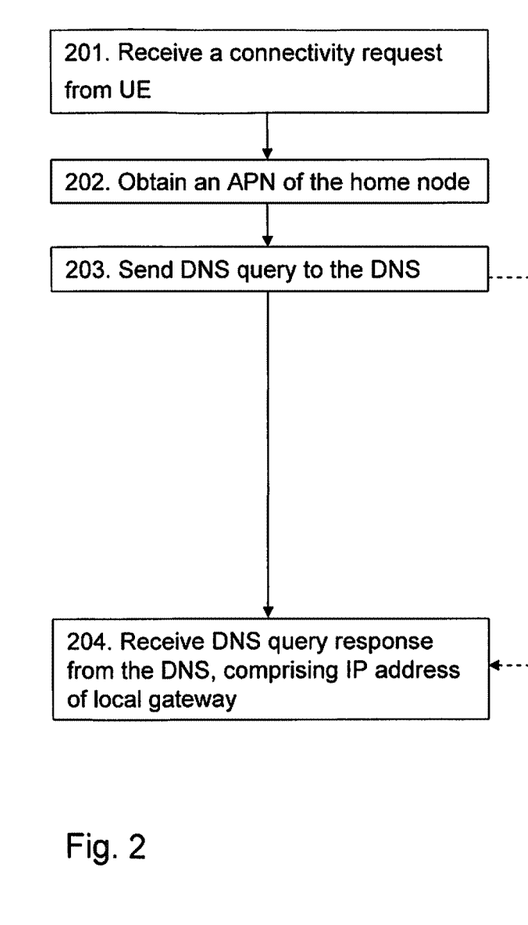
FIG. 2 is a flowchart illustrating operations of an access control node according to some embodiments.
Figure 6:
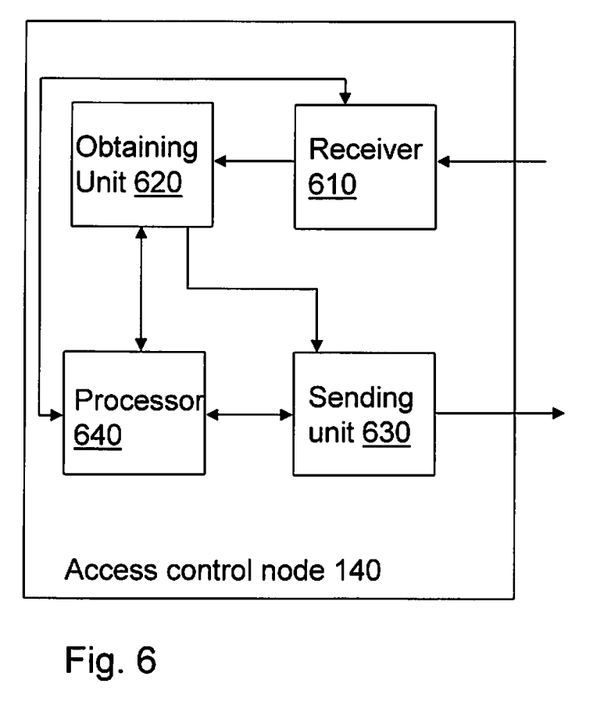
FIG. 6 is a block diagram illustrating an access control node according to some embodiments.

To perform the method steps above for selecting of a local gateway 130 co-located with or near a home node 110, referred to in FIG. 2, the access control node 140 comprises an arrangement depicted in FIG. 6.

The access control node 140 comprises a receiver 610 configured to receive a connectivity request from a user equipment 120, the user equipment 120 requesting a local or remote connection to the home node 110.

An identifier of the home node gateway 150 may be comprised in the connectivity request. The identifier of the home node gateway 150 may be added to the domain name system query.

The access control node 140 further comprises an obtaining unit 620 configured to obtain an access point name of the home node 110.

The access point name may e.g. be obtained from the received connectivity request or by bringing a default access point name.

When the access point name is received in the connectivity request, the access point name may indicate that Local IP Access or Selective IP Traffic Offload shall be used for the connection.

In some embodiments, the access point name comprises a cell identifier, a home node identifier or remote-access-ID. In these embodiments, the domain name system query may comprise a request for an IP address of the home node 110 that is associated with the cell identifier, the home node identifier or the remote-access-ID comprised in the obtained access point name.

The cell identifier may be a service area identity, an the Universal Terrestrial Radio Access Network cell identity, or an extended radio network controller identity.

The cell identifier may be adapted to be used to identify the home node 110. The cell identifier may comprises a home node identifier or an identifier of a closed subscriber group.

The cell identifier may be obtained by using information available in an S1/Iu message carrying a non access stratum command to setup the new Local IP Access or Selective IP Traffic Offload connection.

The access control node 140 further comprises a sending unit 630 configured to send a domain name system query to a home node gateway 150 associated with the home node 110, by addressing a domain name system server 160. The query comprises a request for an IP address of the local gateway 130 that is associated with the obtained access point name.

The user or location information may be added to the access point name.

The receiver 610 is further configured to receive a response from the domain name system server 160, the response comprising the requested IP address of the local gateway 110.

In some embodiments, wherein the Local IP Access or Selective IP Traffic Offload is to be applied, an evolved universal terrestrial radio access network cell global identity or a home node 110 identifier, and an identifier of the home node gateway 150 is adapted to be added to the domain name system query, or is adapted to be sent as parameters to the domain name system server 160.

In some embodiments wherein remote access is to be applied, the access point name may comprise a closed subscriber group identifier. The closed subscriber group identifier may be adapted to be added to the domain name system query.

Figure 3:
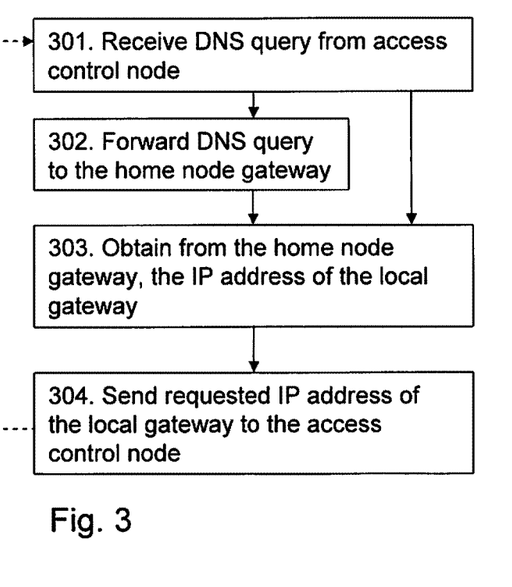
FIG. 3 is a flowchart illustrating operations of a domain name system server according to some embodiments.
Figure 7:
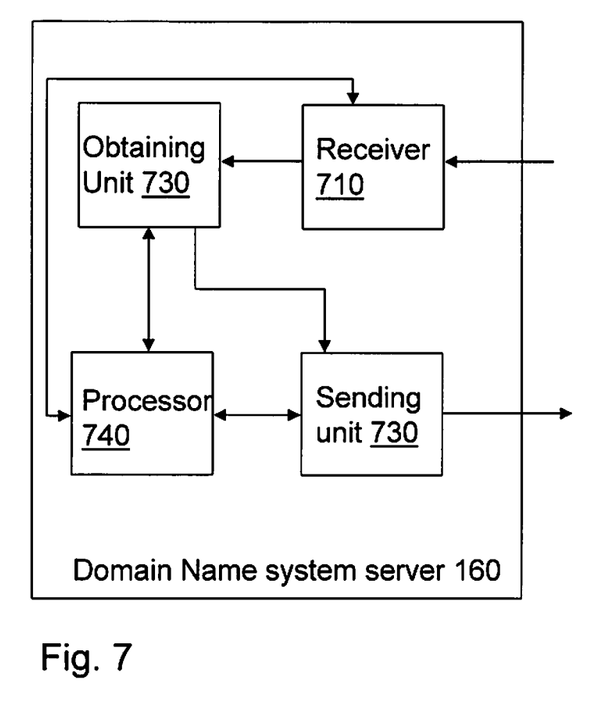
FIG. 7 is a block diagram illustrating a domain name system server according to some embodiments.

To perform the method steps above for enabling selecting of a local gateway 130 co-located with or near a home node 110, referred to in FIG. 3, the domain name system server 160 comprises an arrangement depicted in FIG. 7.

The domain name system server 160 comprises a receiver 710 configured to receive from an access control node 140, a domain name system query to a home node gateway 150 associated with the home node 110. The domain name system query comprises a request for a local gateway 130 IP address that is associated with an access point name associated with the home node 110 The access point name is comprised in the received domain name system query.

In some embodiments an identifier of the home node gateway 150 is comprised in the domain name system query received from the access control node 140. This identifier of the home node gateway 150 is adapted to be used to identify the home node gateway 150 for forwarding the domain name system query to it.

In some embodiments the access point name comprises a cell identifier, a home node identifier or remote-access-ID. In these embodiments the domain name system query comprises a request for an IP address of the home node 110 that is associated with the cell identifier, the home node identifier or the remote-access-ID comprised in the obtained access point name.

The domain name system server 160 further comprises an obtaining unit 720 configured to obtain from the home node gateway 150, the IP address of the local gateway 110 that is associated with the access point name.

The obtaining unit 720 may further be configured to obtain the IP address of the local gateway 130 that is associated with the access point name, by receiving it from the home node gateway 150 a priori of the action of receiving 601 the a domain name system query.

The domain name system server 160 further comprises a sending unit 730 configured to send a response to the access control node 140. The response comprises the requested IP address of the local gateway 130, which IP address of the local gateway 130 enables the access control node 140 to select the local gateway 130.

In some embodiments the sending unit 720 further is configured to forward the received domain name system query to the home node gateway 150 corresponding to the user equipment 120. In these embodiments, the IP address of the local gateway 110 being associated with the access point name may be adapted to be obtained from the home node gateway 150, answering the domain name system query.

In some embodiments, Local IP Access or Selective IP Traffic Offload is to be applied. In these embodiments an evolved universal terrestrial radio access network cell global identity or a home node 110 identifier, and an identifier of the home node gateway 150 is comprised in the domain name system query, or is adapted to be received as parameters from the access control node 140.

The present mechanism for enabling selection of, or selecting the local gateway 130 co-located with or near the home node 110 may be implemented through one or more processors, such as a processor 640 in the access control node 140 depicted in FIG. 6, or a processor 740 in the domain name system server 160 depicted in FIG. 7, together with computer program code for performing the functions of the present solution. The program code mentioned above may also be provided as a computer program product, for instance in the form of a data carrier carrying computer program code for performing the present solution when being loaded into the access control node 140 or the domain name system server 160. One such carrier may be in the form of a CD ROM disc. It is however feasible with other data carriers such as a memory stick. The computer program code can furthermore be provided as pure program code on a server and downloaded to the access control node 140 or the domain name system server 160 e.g. remotely.

When using the word "comprise" or "comprising" it shall be interpreted as non-limiting, i.e. meaning "consist at least of".

The present invention is not limited to the above described preferred embodiments. Various alternatives, modifications and equivalents may be used. Therefore, the above embodiments should not be taken as limiting the scope of the invention.

ABBREVIATIONS 3G 3rd Generation
3GPP 3rd Generation Partnership Project
APN Access Point Name
CGI Cell Global Identifier
CSG Closed Subscriber Group
DNS Domain Name System
ECGI E-UTRAN Cell Global Identity
EPC Evolved Packet Core
EPS Evolved Packet System
eNB eNodeB
(e)NB eNodeB or Node B
E-UTRAN Evolved UTRAN
FQDN Fully Qualified Domain Name
GGSN Gateway GPRS Support Node
GPRS General Packet Radio Service
GW Gateway
HeNB Home eNodeB
H(e)NB Home eNodeB or Home Node B
HeNB GW Home eNodeB Gateway
H(e)NB GW Home eNodeB Gateway or Home Node B Gateway
HNB Home Node B
HNB GW Home Node B Gateway
HSS Home Subscriber Server
ID Identity
IE Information Element
IMSI International Mobile Subscriber Identity
IP Internet Protocol
ISDN Integrated Services Digital Network
LIPA Local IP Access
LTE Long Term Evolution
MCC Mobile Country Code
MME Mobility Management Entity
MNC Mobile Network Code
MSISDN Mobile Subscriber ISDN Number
NAS Network Access Stratum
NB Node B
O&M Operation & Maintenance
PDN Packet Data Network
PDN GW Packet Data Network Gateway
PDP Packet Data Protocol
RAI Routing Area Identity
RAN Radio Access Network
RANAP Radio Access Network Application Part
RNC Radio Network Controller
S1 Interface between eNB and EPC (i.e. between eNB and MME/S-GW).
S1AP S1 Application Protocol
SAI Service Area Identity
SGSN Serving GPRS Support Node
S-GW Serving Gateway
SIPTO Selective IP Traffic Offload
TAI Tracking Area Identity
UE User Equipment
UTRAN Universal Terrestrial Radio Access Network

The invention claimed is:

1. A method in an access control node for selecting of a local gateway co-located with or near a home node, the method comprising:
    receiving a connectivity request from a user equipment, the user equipment requesting a local or remote connection to the home node;
    obtaining an access point name of the home node, wherein the access point name comprises a cell identifier; and
    selecting the local gateway co-located with or near the home node by performing operations comprising:
        sending a domain name system query that is based on the cell identifier comprised in the obtained access point name, to a home node gateway associated with the home node, by addressing a domain name system server; and receiving a response from the domain name system server, the response comprising an IP address of the local gateway.

2. Method according to claim 1, further comprising:
identifying the home node gateway for sending the domain name system query in response to an identifier of the home node gateway that is comprised in the connectivity request; and
adding the identifier of the home node gateway to the domain name system query.

3. Method according to claim 1, further comprising obtaining the access point name from the received connectivity request.

4. Method according to claim 1, further comprising obtaining the access point name in response to a default access point name.

5. Method according to claim 1, wherein the cell identifier is a service area identity, an Universal Terrestrial Radio Access Network cell identity, or an extended radio network controller identity.

6. Method according to claim 1, further comprising adding user information or location information to the access point name.

7. Method according to claim 1, further comprising identifying the home node using the cell identifier, wherein the cell identifier comprises a home node identifier or the identifier of a closed subscriber group.

8. Method according to claim 1, further comprising obtaining the cell identifier using information available in an S1/Iu message carrying a non access stratum command to setup the new Local IP Access or Selective IP Traffic Offload connection.

9. Method according to claim 1, further comprising determining from the access point name whether Local IP Access or Selective IP Traffic Offload shall be used for the connection to the home node.

10. Method according to claim 9, further comprising:
using the determined Local IP Access or Selective IP Traffic Offload for the connection to the home node; and
performing one of:
adding to the domain name system query an evolved universal terrestrial radio access network cell global identity or a home node identifier, and an identifier of the home node gateway; and
sending as parameters to the domain name system server an evolved universal terrestrial radio access network cell global identity or a home node identifier, and an identifier of the home node gateway.

11. Method according to claim 1, wherein remote access is to be applied, and wherein the access point name comprises a closed subscriber group identifier and wherein the closed subscriber group identifier is added to the domain name system query.

12. The method of claim 1, wherein:
obtaining the access point name comprises obtaining, via the access control node, the access point name of the home node, wherein the access point name further comprises an indication as to whether Selective IP Traffic Offload or Local IP Access should be used for the connection to the home node;
the method further comprises determining from the access point name that the Selective IP Traffic Offload shall be used for the connection to the home node;
sending the domain name system query comprises sending, in the domain name system query, via the access control node, a cell global identity that is included in the access point name, wherein the response to the domain name system query is based on a lookup by the domain name system server of an association between the IP address of the local gateway and the cell global identity; and
the method further comprises using the Selective IP Traffic Offload for the connection to the home node.

13. The method of claim 12,
wherein the access control node comprises a Mobility Management Entity (MME) and/or Serving GPRS Support Node (SGSN); and
wherein sending the domain name system query further comprises:
sending, in the domain name system query, via the MME and/or SGSN, a request for the IP address of the local gateway.

14. A method in a domain name system server for enabling selection of a local gateway for a user equipment, which local gateway is co-located with or near a home node serving the user equipment, the method comprising:
receiving from an access control node, a domain name system query to a home node gateway associated with the home node that is associated with an access point name, wherein the access point name comprises a cell identifier, and wherein the domain name system query is based on the cell identifier comprised in the access point name;
obtaining from the home node gateway, an IP address of the local gateway that is associated with the access point name; and
sending a response to the access control node, the response comprising the IP address of the local gateway, which IP address of the local gateway enables the access control node to select the local gateway.

15. Method according to claim 14, further comprising:
forwarding the received domain name system query to the home node gateway corresponding to the user equipment; and
obtaining the IP address of the local gateway being associated with the access point name from the home node gateway answering the domain name system query.

16. Method according to claim 14, wherein an identifier of the home node gateway is comprised in the domain name system query received from the access control node, and further comprising using the identifier of the home node gateway to identify the home node gateway for forwarding the domain name system query to it.

17. Method according to claim 14, wherein obtaining the IP address of the local gateway that is associated with the access point name comprises receiving the IP address from the home node gateway before the domain name system query is received from the access control node.

18. Method according to claim 14, wherein Local IP Access or Selective IP Traffic Offload is to be applied, and wherein an evolved universal terrestrial radio access network cell global identity or a home node identifier, and an identifier of the home node gateway is comprised in the domain name system query, or is received as parameters from the access control node.

19. An access control node for selecting of a local gateway co-located with or near a home node, the access control node comprising:
a receiver configured to receive a connectivity request from a user equipment, the user equipment requesting a local or remote connection to the home node;

an obtaining unit configured to obtain an access point name of the home node, wherein the access point name comprises a cell identifier; and a sending unit configured to send a domain name system query that is based on the cell identifier comprised in the obtained access point name, to a home node gateway associated with the home node, by addressing a domain name system server, and wherein the receiver is further configured to receive a response from the domain name system server, the response comprising an IP address of the local gateway.

20. A domain name system server for enabling selection of a local gateway for a user equipment, which local gateway is co-located with or near a home node serving the user equipment, the domain name system server comprising:

a receiver configured to receive from an access control node, a domain name system query to a home node gateway associated with the home node that is associated with an access point name, wherein the access point name comprises a cell identifier, and wherein the domain name system query is based on the cell identifier comprised in the access point name;

an obtaining unit configured to obtain from the home node gateway, an IP address of the local gateway that is associated with the access point name; and a sending unit configured to send a response to the access control node, the response comprising the IP address of the local gateway, which IP address of the local gateway enables the access control node to select the local gateway.

* * * * *